Nov. 22, 1938.  F. N. ROSS  2,137,657
FASTENER DEVICE
Filed July 30, 1936  2 Sheets-Sheet 1
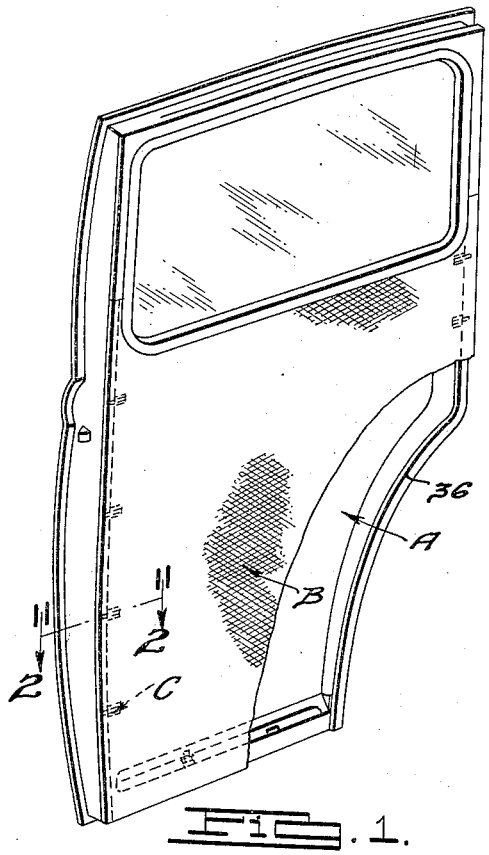
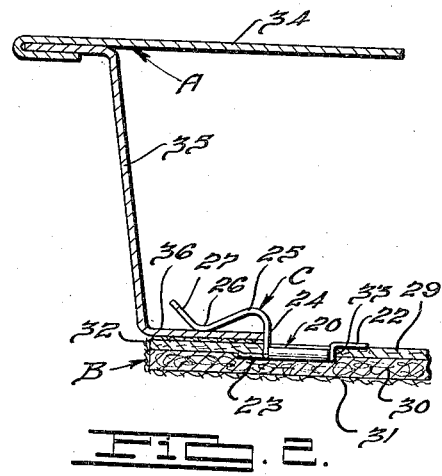
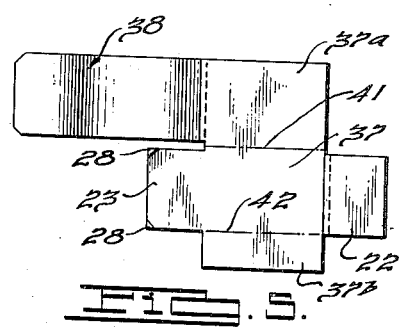
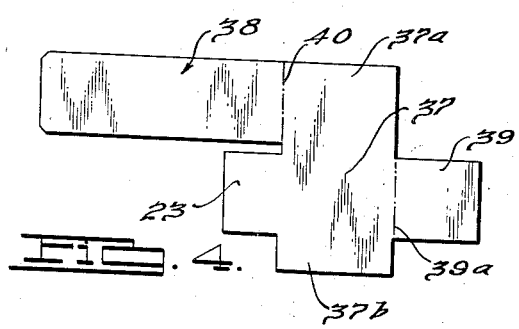
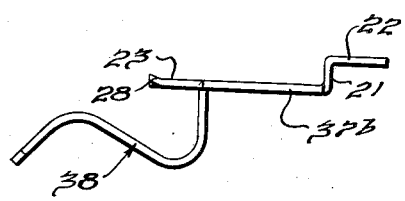
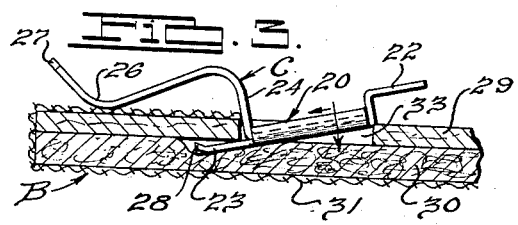
INVENTOR
Frederick N. Ross.
BY Dike, Calver & Gray
ATTORNEYS.

Nov. 22, 1938.  F. N. ROSS  2,137,657

FASTENER DEVICE

Filed July 30, 1936  2 Sheets-Sheet 2

INVENTOR
Frederick N. Ross.
BY
Dike, Calver & Gray
ATTORNEYS.

Patented Nov. 22, 1938

2,137,657

UNITED STATES PATENT OFFICE 2,137,657

FASTENER DEVICE

Frederick N. Ross, Detroit, Mich., assignor to Briggs Manufacturing Company, Detroit, Mich., a corporation of Michigan Application July 30, 1936, Serial No. 93,371

10 Claims. (Cl. 24—259)

This invention relates to fastener devices for trim panels or the like and particularly to fastener devices adapted for use in the interior trim finish of automobiles or other vehicle bodies.

An object of the invention is to provide an improved fastener means for removably attaching with ease and facility a trim panel or the like to the door or other portion of the framing of a vehicle body.

A further object of the invention is to provide a new and improved fastener device for detachably securing an interior trim panel or the like to the body so that by virtue of the invention there is provided a fastener device of relatively simple construction which may be manufactured at low cost and assembled on the panel with a minimum of time and labor and enabling the provision of a trim panel which may be easily applied to the door or other framing of the vehicle body.

Another object of the invention is to provide an improved fastener device for a trim panel which may be cheaply and easily manufactured from a single piece or strip of metal and which may be assembled on the trim panel after applying the trim material thereto without the necessity of using separate retainer or clip devices for holding the fastener element in place.

Other objects and advantages of this invention will appear in the following description and appended claims, when considered in connection with the accompanying drawings forming a part of this specification, wherein like reference characters designate corresponding parts in the several views.

Fig. 1 is a perspective view, partly broken away, illustrating an automobile door having mounted thereon a trim panel embodying the present invention.

Fig. 2 is an enlarged fragmentary section taken through lines 2—2 of Fig. 1 in the direction of the arrows.

Fig. 3 is a side elevation, partly in section, of the fastener of Figs. 1 and 2 and illustrating the method of assembly with the panel.

Fig. 4 illustrates a sheet metal blank from which the fastener device may be formed.

Fig. 5 illustrates the first step in the formation of the herein illustrated fastener device.

Fig. 6 is a side view of the structure shown in Fig. 5.

Figure 7:
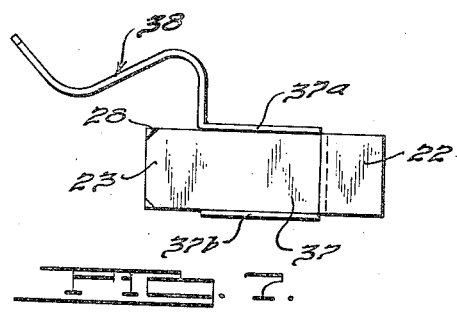
Fig. 7 is a plan view illustrating a succeeding step in the operation of forming the fastener.

Before explaining in detail the present invention it is to be understood that the invention is not limited in its application to the details of construction and arrangement of parts illustrated in the accompanying drawings, since the invention is capable of other embodiments and of being practiced or carried out in various ways. Also it is to be understood that the phraseology or terminology employed herein is for the purpose of description and not of limitation, and it is not intended to limit the invention claimed herein beyond the requirements of the prior art.

Referring to the drawings, there is illustrated therein, by way of example, a door A of an automobile body having mounted thereon, through the medium of fasteners C, a trim panel B, the panel and fasteners being constructed in accordance with the present invention. It will be understood that the trim panels may be of different shapes and sizes and may be mounted at other localities on the inside of the body.

Referring particularly to Figs. 2 and 11 to 13 inclusive, the fastener C in the present form thereof comprises as a one-piece device a body or shank portion generally indicated at 20 having at its rear end an upstanding shoulder or offset portion 21 terminating in a rearwardly directed horizontal tongue or flange 22. The forward edge of the body or shank portion 20 has an extension 23 which provides a horizontally projecting tongue or lug whose bottom surface lies in the plane of the bottom surface of the shank 20. At the juncture of the tongue or lug 23 and the body 20 there rises a vertically extending portion 24 which is turned forwardly to form a bend 25 providing a spring bow. The part 25 extends forwardly and downwardly and then is flared upwardly to produce a curved gripping portion 26 and an upwardly inclined lead portion 27. The parts 25, 26 and 27 thus provide a spring gripping member which by reason of the spring bow 25 will enable the member to be bent or sprung outwardly under tension so as to permit the curved intermediate portion 26 thereof to engage and grip the flange portion of the supporting frame.

Figure 14:
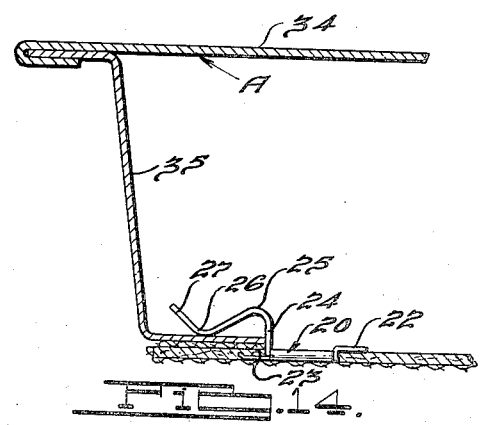
Fig. 14 is a view similar to Fig. 2 illustrating a slight modification.

The trim fastener C is applied and assembled with a trim panel which in the present instance comprises a foundation or backing sheet 29 of fiber board or other suitable material. The face of the backing sheet is covered by means of padding material 30 of jute or other fibrous substance and this layer is in turn covered with trim fabric 31 which is folded around the edge of the foundation sheet 29 as indicated at 32 and cemented at the rear face of the foundation sheet along the edges thereof. At suitable points along the side and bottom edges of the trim panel and inwardly of the cemented edges of the fabric material the foundation sheet 29 is provided with holes or slots therethrough which in the present instance are substantially rectangular in shape. These holes are substantially the area and shape of the body or shank portion 20 of the fastener so that when the fastener is installed the shank portion will preferably entirely fill and close the hole. The fastener may be readily assembled on the trim panel in the manner illustrated in Fig. 3 by first inserting the tongue or lug 23 into the hole so as to extend beneath and underlap the forward edge of the hole. The heel 21 of the fastener or the rear edge thereof is then pressed downwardly so as to force the shoulder 21 into the hole 33 so as to provide a tight fit of the shank portion 20 and the upstanding portions 21 and 24 around the edges of the hole. The front corners of the tongue 23 are preferably bent up slightly as shown at 28 so as to permit this tongue to be inserted between the foundation sheet 29 and the padding 30 without snagging and so as to cause these corners to embed into the underface of the fiber board 29 as illustrated in Fig. 2. When the fastener is thus installed it will be seen, as shown in Fig. 2, that the tongue or lug 22 overlies the rear edge of the hole 33 and the tongue or lug 23 underlies the forward edge of the hole. As a consequence, when the gripping end 26 of the fastener is bent outwardly relative to the shank 20 the fastener will be held against removal due to the bearing of the parts 22 and 23 at opposite sides or opposite ends of the aperture in the panel. It will also be seen that the shank or body portion 20 fits snugly within the hole, entirely fills it, and lies substantially flush with the under-face of the sheet 29. As illustrated in Fig. 14 the foundation sheet 29 at its under-face may be provided with an embossed groove or depression of sufficient depth so that the tongue 23 will fit therein and permit the base of the fastener to lie exactly flush with the under-face of the sheet 29 thereby providing a smooth uninterrupted surface.

In the present instance the trim panel is assembled on the vehicle door A. As illustrated in Fig. 2 the door comprises an outer body panel 34 attached in the usual manner to the upright pillar 35 which at the rear side thereof has an inwardly directed vertically extending flange 36. The framing of the door is such as to provide the flange 36 around the sides and bottom thereof. When assembled on the door structure the trim panel is provided with fasteners C along the sides and bottom thereof. The panel may be readily installed by inserting the flared or lead ends 27 behind the flange 36 along one vertical side of the door and then forcing the panel laterally so as to force the gripping portions 26 of the fasteners over the back face of the flange, as illustrated in Fig. 2, this portion being sprung out during the operation so as to grip the flange under tension. The panel may then be bowed outwardly to a sufficient extent to permit the fasteners at the opposite vertical edge to engage behind the edge of the flange 36. By flattening out the panel the fasteners will be forced into gripping engagement with the flange. The panel may then be slid downwardly so as to cause the fasteners at the lower edge thereof to engage behind the bottom flange of the door.

Figure 11:
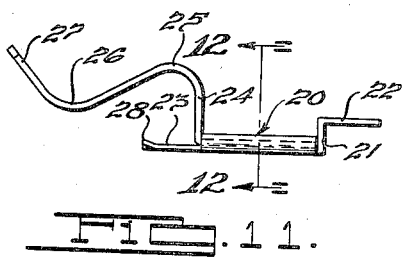
Fig. 11 is a side view illustrating the last step in the operation.
Figure 8:
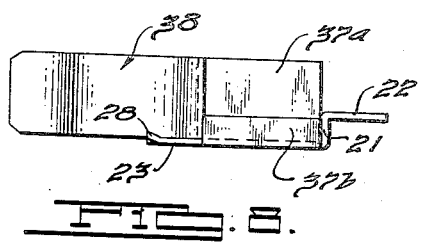
Fig. 8 is a side view of the construction shown in Fig. 7.
Figure 12:
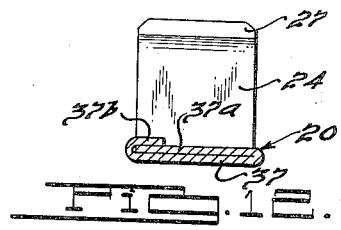
Fig. 12 is a section taken through lines 12—12 of Fig. 11 in the direction of the arrows.
Figure 9:
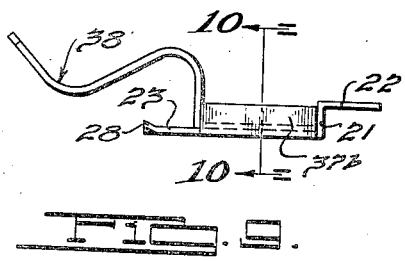
Fig. 9 is a side view illustrating a succeeding step.
Figure 13:
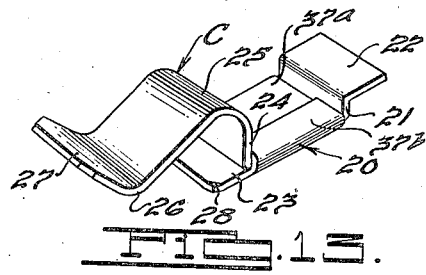
Fig. 13 is a perspective view of the fastener of the preceding figures and the method of assembly thereon on the panel.
Figure 10:
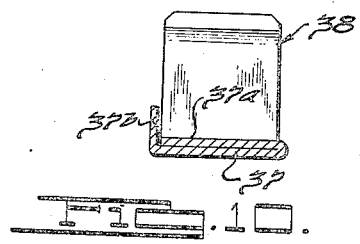
Fig. 10 is a section taken through lines 10—10 of Fig. 9 in the direction of the arrows.

One manner or method of forming the fastener C will now be described. A flat blank of metal is first formed or cut into the shape shown in Fig. 4, comprising a main portion 37, a forwardly extending tongue portion 38, a rearwardly extending tongue 39, laterally projecting portions 37a and 37b, together with a short front extension or portion 23, all of said portions lying in the same plane. The blank so formed is now preferably placed in a press and the extension 38 bent down from the line 40 to the shape shown in Fig. 6, and the tongue 39 is bent along the line 39a so as to provide the abutment or shoulder 21 forming the heel of the fastener and a rearwardly extending tongue or flange 22. During this operation the free edges of the tongue 23 are preferably bent up slightly as shown at 28. The next operation is to bend the portions 38 and 37a along the line 41 at a right angle to the base portion 37 and to bend the lateral extension or portion 37b along the line 42 also at a right angle to the base portion 37. These operations result in the production of the structure illustrated in Figs. 7 and 8. The next step is to bend the portion 37a to overlap and lie flat against the upper face of the portion 37 (see Figs. 9 and 10) in which position it will be noted that the shaped tongue 38 of the fastener has had its position completely reversed from that in which it is shown in Figs. 5 and 6. In other words, the tongue has been turned completely over. The next step is to fold over the lateral portion 37b to overlie the adjacent edge of portion 37a and thus complete the fastener as illustrated in Figs. 11 to 13 inclusive.

The construction of the fastener is preferably such that when installed on the foundation sheet of the panel the base of the curved gripping portion 26 will lie sufficiently close to the rear face of the foundation, or substantially in contact therewith if desired, so that the flange 36 of the support will, when projected between the part 26 and the rear face of the foundation, spring the gripping member outwardly and place it under tension. When the fastener is installed in the panel aperture the heel 21, when forced into the aperture, will frictionally engage the rear edge of the aperture and produce sufficient binding action as to hold the fastener in place by friction. The fastener may be readily removed by first drawing out the heel 21 to tilt the fastener and then withdrawing it by a straight line or rectilinear pull in a rearward direction exactly reverse to the manner of installation.

After the trim panel is installed in the door or body the fasteners cannot be disengaged or withdrawn from the panel by a pulling force applied to the panel, this for the reason that the force is exerted from the gripping portion 26 to the shoulder 24, or vice versa, thereby tending to tilt the fastener which action is resisted by flanges 22 and 23. Hence, dislodgment of the fasteners by attempting to pry or pull the panel from the door is prevented since the forces thus transmitted to the fasteners tend to tilt them in the sockets or apertures 33 and no force is thus exerted in a direction normal to the plane of the foundation which would, as shown in Fig. 3, pull the fasteners out of the apertures.

I claim:

1. A fastener device for a trim panel having an aperture formed therein, comprising a relatively flat base insertable in said aperture having an end flange substantially in its plane adapted to overlap one edge of the panel aperture, a flange at the opposite end of the base and offset therefrom to overlap the opposite edge of said aperture, and a spring gripping member extended from the base, said base forming substantially a rigid connection between said flanges and gripping member, and said second named flange and gripping member being disposed at the same side of the base.

2. A fastener device for a trim panel having an aperture formed therein, comprising a relatively flat base insertable in said aperture having an end flange substantially in its plane adapted to overlap one edge of the panel aperture, a flange at the opposite end of the base and offset therefrom to overlap the opposite edge of said aperture, and a spring gripping member extended from the base between said flanges, said base forming substantially a rigid connection between said flanges and gripping member, and said second named flange and gripping member being disposed at the same side of the base.

3. A fastener device for a trim panel having an aperture formed therein, comprising a relatively flat base insertable in said aperture having an end flange substantially in its plane adapted to overlap one edge of the panel aperture, a flange at the opposite end of the base and offset therefrom to overlap the opposite edge of said aperture, and a spring gripping member extended from the base at the same side thereof as said last named flange, said base forming substantially a rigid connection between said flanges and gripping member, said flanges extending in different planes substantially parallel to the base.

4. A fastener device for a trim panel having an aperture formed therein, comprising a relatively flat base insertable in said aperture having an end flange substantially in its plane adapted to overlap one edge of the panel aperture, a flange at the opposite end of the base and offset therefrom to overlap the opposite edge of said aperture, and a spring gripping member extended from the base between said flanges and disposed at the same side of the base as said second named flange, said base forming substantially a rigid connection between said flanges and gripping member, said flanges extending in different planes substantially parallel to the base.

5. A fastener device for a trim panel including a foundation sheet having an aperture formed therein, comprising a relatively flat base insertable in said aperture having end flanges extending in opposite directions, one thereof substantially in the plane of the base and the other in a plane offset from the plane of said base, said flanges adapted to overlap opposite edges of said aperture at opposite faces of the foundation sheet, and a spring gripping member extended from the base adjacent one of said flanges and disposed at the same side of the base as said offset flange, said base forming a substantially inflexible connection between said flanges and gripping member.

6. A fastener device for a trim panel, comprising a substantially flat base, a pair of longitudinally spaced upstanding shoulders extending from the base, a flange extending from the base substantially in its plane, a second flange extending from one shoulder and offset from said base, and a spring gripping member extending from the other shoulder, said base forming substantially an inflexible connection between said shoulders, and said gripping member being disposed at the same side of the base as said second flange.

7. A fastener device for a trim panel, comprising a substantially flat base, a pair of longitudinally spaced upstanding shoulders extending from the base, a flange extending from the base substantially in its plane, a second flange offset from said base and extending from one shoulder in a direction opposite to the first flange, and a spring gripping member extending from the other shoulder, said base forming substantially an inflexible connection between said shoulders, and said second flange and gripping member being disposed at the same side of the base.

8. A fastener device for a trim panel, comprising a substantially flat base, a pair of longitudinally spaced upstanding shoulders extending from the base, a flange extending from the base substantially in its plane, a second flange extending from one shoulder and offset from said base but substantially parallel thereto, and a spring gripping member extending from the other shoulder, said base forming substantially an inflexible connection between said shoulders, and said gripping member and second flange being disposed at the same side of the base.

9. A fastener device for a trim panel, comprising a substantially flat base, a pair of longitudinally spaced upstanding shoulders extending from the base, a flange extending from the base substantially in its plane, a second flange offset from said base and extending from one shoulder in the opposite direction to the first flange but substantially parallel with the base, and a spring gripping member extending from the other shoulder, said base forming substantially an inflexible connection between said shoulders, and said gripping member and second flange being disposed at the same side of the base.

10. A fastener device for a trim panel, comprising a substantially flat base, a pair of longitudinally spaced upstanding shoulders extending from the base, said base having an end extension substantially in its plane, a flange extending from one shoulder and offset from said base, and a spring gripping member extending from one of the shoulders, said base forming substantially an inflexible connection between said shoulders, and said gripping member being disposed at the same side of the base as said flange.

FREDERICK N. ROSS.